Nov. 12, 1963
G. LHOMME ETAL
3,110,329
DEVICE FOR STRIPPING A WIRING CONDUCTOR
AND FIXING IT ON A CONNECTOR
Filed March 21, 1961
2 Sheets-Sheet 1
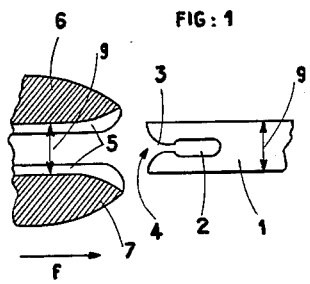
FIG: 1
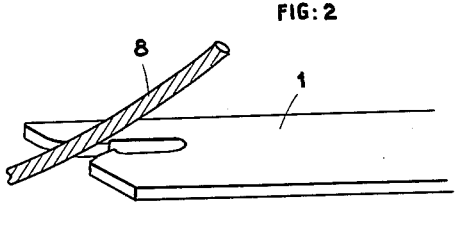
FIG: 2
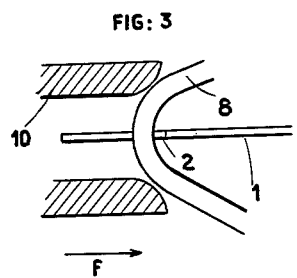
FIG: 3
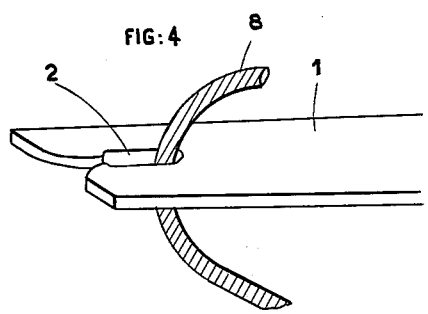
FIG: 4
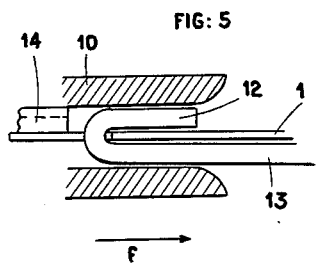
FIG: 5
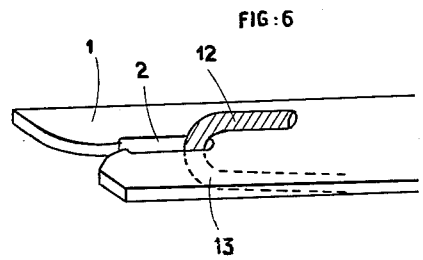
FIG: 6
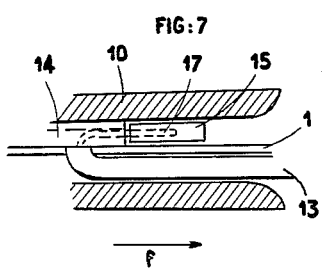
FIG: 7
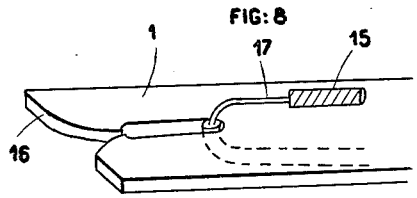
FIG: 8
INVENTORS
GUSTAVE LHOMME
HENRI GLADIEU
BY Paul M. Craig Jr.
ATTORNEY Nov. 12, 1963    G. LHOMME ETAL    3,110,329
DEVICE FOR STRIPPING A WIRING CONDUCTOR
AND FIXING IT ON A CONNECTOR
Filed March 21, 1961    2 Sheets-Sheet 2
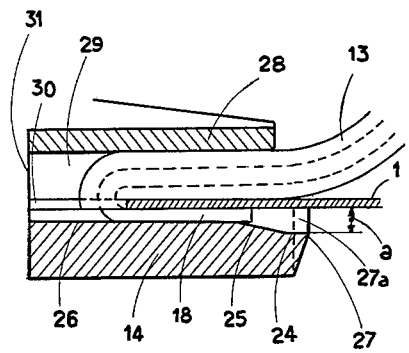
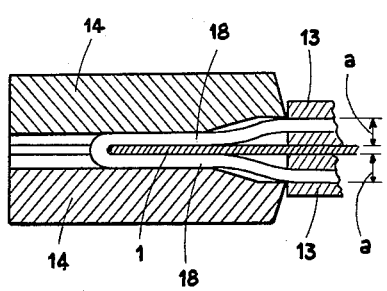
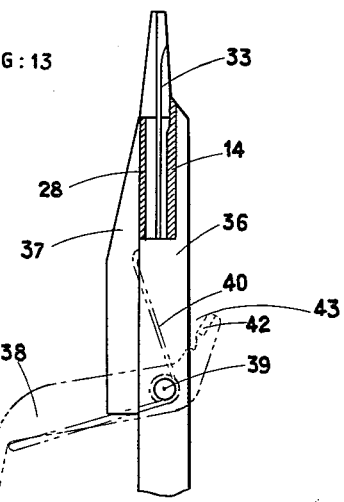
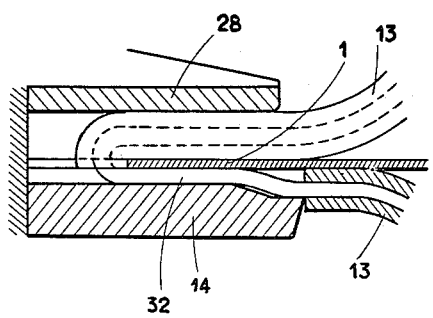
INVENTORS
GUSTAVE LHOMME
HENRI GLADIEU
BY Paul M. Craig Jr.
ATTORNEY United States Patent Office 3,110,329
Patented Nov. 12, 1963

3,110,329
DEVICE FOR STRIPPING A WIRING CONDUCTOR AND FIXING IT ON A CONNECTOR
Gustave Lhomme, Paris, and Henri Gladieu, Malakoff, France, assignors to Compagnie Industrielle des Telephones, Paris, France, a French corporation
Filed Mar. 21, 1961, Ser. No. 97,213
Claims priority, application France Mar. 24, 1960
2 Claims. (Cl. 140—1)

This invention covers a device to facilitate fixing wiring conductors on connectors.

The device can be used to advantage in all industries where wiring conductors have to be joined, but is particularly suitable for industries in the field of telecommunications, remote control, signalization, calculating machines and similar industries, where the number of connections may be considerable.

It is well known that before a wiring conductor is welded to a connector it has to be prepared. This preparation consists in stripping the wire over a short length, then, using pincers, winding it round the pin on which it will be welded. In the case of a multi-joint on a single connector, the preparation is two-fold: the incoming wire is cut to the desired length, stripped and wound on the pin, then the outgoing wire is stripped in turn and wound on the same pin. In practice, the operator has three tools available: cutting pincers to cut the wire, stripping pincers to remove the insulating sheath and round-nosed pincers to wind the wire on the pin. These operations are carried out one after the other with the corresponding tool. The total time required is therefore the sum of the times required for the three operations and the time required to put down one tool and take the next.

It is known that it is possible to have a single tool for cutting and stripping the wire and putting on the pin, but the three successive operations nevertheless remain, and among them that of hooking or placing the wire on the pin is a comparatively lengthy one. Thus, even if considerable time is saved by the use of a single combined tool, the overall time required for carrying out the three operations successively is still substantial.

This invention covers a device by means of which the operations of stripping and winding on the connecting pin can be carried out simultaneously in practice. As the wire is not systematically cut each time it is placed on the pin, this operation is provided for separately, but by means of the same tool, so that it can be effected only when necessary.

According to the invention, the device uses the connector as a guide for a tool with a cutting part in the shape of a tunnel, of which the diameter corresponds to that of the bare wire without insulation, so that the insulating sheath of the wiring conductor is cut cross-wise and ejected by the simple forward movement of the tool, the stripped part of the wire being tightly held against the connector at the same time.

It will easily be realized that a certain precision is necessary to ensure that the tool will cut the insulating sheath without cutting the conductor. This precision is obtained through the connector pin sliding in a suitable slot in the tool and thus acting as guide.

The longitudinal profile of the tunnel forming the cutting part of the tool is reverse tapered in the direction of movement, so that at the end of the forward movement the conductor is pressed tightly against the connector.

The advantage of the device according to the invention consists above all in a substantial saving in time, since the two operations of stripping and fixing the wire are carried out simultaneously and the overall time required is less than that for simply fixing the wire according to the method hitherto used. In the case of a multiply connection, the saving in time is still greater, since a single operation is substituted for the time necessary for cutting the wire, plus two periods of stripping, plus two periods for attaching the wire. Another advantage of the device according to the invention is that the welds are always identical with each other, in both quality and outside appearance.

The figures of the attached sketches show one embodiment of the device according to the invention, by way of illustration.

FIGURE 1 shows a connector and the guide entrance in the tool.

FIGURES 2 to 8 show diagrammatically the functioning of the device according to the invention.

FIGURES 9 to 12 show the arrangement of the knives of the device according to the invention.

FIGURE 13 shows a form of embodiment of a complete tool according to the invention.

In FIGURE 1, reference 1 is a connector given as an example, with a recess 2 extended by a slot 3, which is narrower than the recess but wide enough to take a wiring conductor with its insulation. This slot ends in a flared mouth 4. As an example, guiding is ensured by the width $g$ of the connector, which corresponds to the distance $g$ between the two jaws 6 and 7 of the tool. Each of the tool jaws 6 and 7 has a groove of which the lips 5 constitute the sides. When the tool moves forward in the direction of the arrow $f$, the connector 1 engages between the two grooves 5 of the jaws. It stops when the end of the connector strikes against the rear wall of the tool, and the travel corresponds to a suitable predetermined length of the stripped part.

FIGURES 2, 4, 6 and 8 show the results to be obtained and FIGURES 3, 5 and 7 show diagrammatically how they are obtained according to the invention. In FIGURE 2 the end of the wiring conductor is placed in line with the slot in the connector 1. In FIGURE 3 the device 10 according to the invention slides on the connector 1. The conductor 8, pushed by the tool 10 in the direction of the arrow $f$, strikes against the back of the recess and is bent at the same time. FIGURE 4 shows the result obtained at this stage, the tool not being shown.

In FIGURE 5 the tool 10 is continuing to advance in the direction of the arrow $f$. The upper end strand 12 and the lower strand 13 are held tightly against the connector 1. A knife 14, of a special tunnel shape, integral with the tool 10, appears. The result so far obtained is shown in FIGURE 6. The wiring conductor, still held against the rear of the recess 2, has taken on the shape of a very flat hook, and the distance between the strands 12 and 13 is equal to the thickness of the connector 1.

In FIGURE 7 the tool 10 is still continuing to slide along the connector 1 in the direction of the arrow $f$. The knife 14, integral with the tool 10, has cut through the insulating sheath of the strand 15 and is pushing it along in its traversing movement. The conductor is thereupon tightly pressed against the connector 1 owing to the fact that the height of the tunnel 14 decreases from front to rear in the direction of movement of the tool. Only the upper strand is stripped in this example. The result obtained is seen in FIGURE 8. The insulating sheath has not been fully ejected, for the tool has not yet completed its movement. When it has done so, that is to say, when the end 16 of the connector strikes against the rear of the tool, the waste sheath 15 has been removed. The conductor 17 is pressed tightly against the connector 1.

FIGURE 9 gives a diagrammatic view of the stripping of the wire, represented here by its conductor 18 surrounded by its insulating sheath 19. The knife 14 has a cutting part 21 in the shape of a tunnel, the diameter of which is equal to the diameter of the bare conductor. The height *a* of the tunnel corresponds to the diameter of the bare conductor increased by the thickness of the insulating sheath. Thus, when the knife 14 moves along the wiring conductor, it obviously cuts through the insulating sheath on the contour of the tunnel itself. Only the hatched part 22 is not cut and remains attached to the strand of the wire. But as this part is very small it becomes detached under the thrust of the tool, so that in practice the cut-off insulation is in the shape of a small hollow cylinder as shown at 15 in FIGURE 8.

FIGURES 10, 11 and 12 show the knives of the tool according to the invention in two different practical examples, for the weld to be made may be a single weld (FIGURE 10) or a "multiply" weld (FIGURES 11 and 12). In case of a single weld the wire has to make only one contact. It is cut to the appropriate length and welded to the desired connector. In the case of a multiply weld, the wire must make several contacts. After having been welded to a first connector, it goes on to a second connector where it must also be welded, then to a third, etc. In this case the wire should not be cut until it has reached its last point for the multiply weld.

FIGURE 10 shows how the wiring conductor is prepared: it is stripped and tightened on the pin in a single operation in the case of a single weld. As has already been seen, the knife 14 is in the shape of a tunnel. It is constituted by the part situated below the connector, and its longitudinal profile consists of three parts: one part, 24, forming the entrance to the tunnel, of which the height *a* represents the diameter of the bare conductor increased by the thickness of the insulating sheath already defined in FIGURE 9. The width of the tunnel is equal to the diameter of the bare conductor 18; the cutting part of the knife 27 exists, of course, throughout the circumference of the tunnel, as shown by the dotted line 27*a*; the second part of the tunnel is shown at 25; it is tilted in relation to the connector 1 so as to allow for the thickness of the insulating sheath of the wiring conductor. Finally, the part 26 is also in the shape of a tunnel, of which the height is equal to the diameter of the bare conductor, the width of the tunnel still remaining equal to the diameter of the bare conductor. The part 28 of the tool serves to guide the sheathed wire 13; it has a recessed portion 29 finishing in a part 30 in the form of a groove in which the connector slides. The height of the tunnel-shape recessed part 29 corresponds to the diameter of the insulated wire 13 and its width corresponds also to this diameter. The end of the tool stroke is marked by the arrival of the end 16 (see FIGURE 8) against the back 31 of the tool.

FIGURE 11 shows exactly the same tool as FIGURE 10, with its knife 14 and its guiding member 28. Its use alone is different. Instead of a single weld, this is a multiply weld, that is to say, the wire 13 is not cut and has only one stripped part 32 to permit of subsequent welding on the connector 1.

FIGURE 12 also represents a method of using the tool for multiply welding. However, it will be noted that instead of having only one knife 14 as in FIGURE 11, it has two knives arranged symmetrically in relation to the connector 1. Thus, the movement of the tool strips both strands 13 of the wire simultaneously, and the bare conductors 18 are in contact with the connector 1 and its two opposite faces. In this case, therefore, a double weld can be made. It is also possible to effect double stripping according to the method shown in FIGURE 12 and to apply it to the single weld shown in FIGURE 10. All that is necessary is that one of the strands 18 be cut in a similar manner to the lower strand 18 in FIGURE 10.

By way of example, FIGURE 18 shows a complete device according to the invention. The tool guide slot for the connector is shown at 33, the knife is shown at 14 and the guide member at 28. These parts are held in place by the body of the tool 36 and the cover 37. Cutting pincers (shown by a dot-and-dash line) are combined with the device according to the invention to form a single tool. It is constituted by a lever 38 which can rotate round a pin 39. This lever is held in a certain position at rest by a spring 40. When pressure is applied in the direction of the arrow 41 the cutting member 42 slides against the surface of the tool body 36 and can cut a wiring conductor placed at 43. The spring 40, which has been tightened during this movement, then forces the lever 38 back into its rest position.

It goes without saying that detail changes in the construction of the tool would not take it out of the scope of the invention—for instance, if the knives and guide members were made in one or more parts, or the cutting pincers were differently arranged. Nor would a multiple tool capable of doing the above-described work simultaneously on several connectors be outside the scope of this invention. In the same way, the connectors could be of a different shape, the slot through which the conductor is passed could be different or even non-existent, as these changes can only involve elementary adaptations of the tool. In the same way, the guiding action of the connector could be ensured in various ways.

What we claim is:

1. In a method of stripping an insulated wire and fastening the wire to an electrical connector, the steps of inserting said wire and said electrical connector into an elongated recess provided in a tool, bending said wire into an essentially U-shaped configuration abutting opposite sides of said connector during insertion, cutting the insulation surrounding said wire and removing the insulation from a predetermined length of said wire by insertion of the U-shaped portion of said wire through tunnel-shaped knife means having a diameter approximately corresponding to the diameter of the bare wire, simultaneously pressing the wire against said electrical connector, and withdrawing said wire and said electrical connector as an assembled unit from said recess.

2. A method of stripping an insulated wire and fastening the wire to an electrical connector, comprising the steps of inserting said wire and said electrical connector into an elongated recess provided in a tool, bending said wire into an essentially U-shaped configuration abutting opposite sides of said connector during insertion, cutting the insulation surrounding said wire and removing the insulation from a predetermined length of said wire by insertion of the U-shaped portion of said wire through tunnel-shaped knife means having a diameter approximately corresponding to the diameter of the bare wire, simultaneously pressing the wire tightly against said electrical connector, withdrawing said wire and said electrical connector as an assembled unit from said recess, and rigidly uniting said wire to said electrical connector.

References Cited in the file of this patent

UNITED STATES PATENTS

| | | |
|---|---|---|
| 2,591,649 | Whiting | Apr. 1, 1952 |
| 2,885,764 | Shulters et al. | May 12, 1959 |

FOREIGN PATENTS

| | | |
|---|---|---|
| 818,746 | Great Britain | Aug. 19, 1959 |